(12) United States Patent
Benz et al.

(10) Patent No.: US 9,458,915 B2
(45) Date of Patent: Oct. 4, 2016

(54) SPACER FOR BELT TENSIONER

(71) Applicant: Cummins IP, Inc., Minneapolis, MN (US)

(72) Inventors: Eric Benz, Nashville, NC (US); Paul H. Anderson, Columbus, IN (US); Carl M. Carpenter, Rocky Mount, NC (US)

(73) Assignee: CUMMINS IP, INC., Minneapolis, MN (US)

( * ) Notice: Subject to any disclaimer, the term of this patent is extended or adjusted under 35 U.S.C. 154(b) by 0 days.

(21) Appl. No.: 14/652,644

(22) PCT Filed: Jan. 23, 2014

(86) PCT No.: PCT/US2014/012718
§ 371 (c)(1),
(2) Date: Jun. 16, 2015

(87) PCT Pub. No.: WO2014/120546
PCT Pub. Date: Aug. 7, 2014

(65) Prior Publication Data
US 2015/0337927 A1    Nov. 26, 2015

Related U.S. Application Data

(60) Provisional application No. 61/758,338, filed on Jan. 30, 2013.

(51) Int. Cl.
| F16H 7/10 | (2006.01) |
| F16H 7/12 | (2006.01) |
| F16H 7/24 | (2006.01) |
| F16H 7/08 | (2006.01) |

(52) U.S. Cl.
CPC ...... *F16H 7/24* (2013.01); *F16H 7/12* (2013.01); *F16H 7/1281* (2013.01); *F16H 2007/0842* (2013.01); *F16H 2007/0865* (2013.01); *F16H 2007/0893* (2013.01)

(58) Field of Classification Search
CPC .......... F16H 2007/081; F16H 7/1281; F16H 2007/0893; F16H 2007/0846; F16H 2007/088
USPC .......................................... 474/135, 133, 112
See application file for complete search history.

(56) References Cited

U.S. PATENT DOCUMENTS

| 3,071,980 A | * | 1/1963 | Brewer ................. F16H 7/1281 474/133 |
| 3,358,521 A | * | 12/1967 | Browning, Jr. ....... F16H 7/1281 474/133 |
| 4,144,772 A | * | 3/1979 | Brackin ................ F16H 7/1245 474/135 |

(Continued)

FOREIGN PATENT DOCUMENTS

| EP | 1169199 | 11/2002 |
| EP | 1701062 | 1/2008 |

OTHER PUBLICATIONS

The International Search Report and Written Opinion of the International Searching Authority issue in PCT/US2014/012718, dated Jul. 14, 2014.

*Primary Examiner* — Henry Liu
(74) *Attorney, Agent, or Firm* — Foley & Lardner LLP

(57) ABSTRACT

A belt assembly for internal combustion engine that has a tensioner mount is described. The belt assembly includes a spacer that is rotatably coupleable to the tensioner mount, and a tensioner that is co-rotatably coupled to the spacer. The spacer is positioned between the tensioner and the tension mount.

18 Claims, 5 Drawing Sheets

(56) References Cited

U.S. PATENT DOCUMENTS

| | | | | |
|---|---|---|---|---|
| 4,285,676 A * | 8/1981 | Kraft | F16H 7/1281 | 267/155 |
| 4,392,840 A * | 7/1983 | Radocaj | F16H 7/1272 | 474/117 |
| 4,472,162 A * | 9/1984 | Hitchcock | F16H 7/1218 | 474/117 |
| 4,500,303 A * | 2/1985 | Sermersheim | F16H 7/1281 | 424/117 |
| 4,504,254 A * | 3/1985 | Foster | F16H 7/1245 | 29/452 |
| 4,596,538 A * | 6/1986 | Henderson | F16H 7/1218 | 474/117 |
| 4,838,839 A * | 6/1989 | Watanabe | F16H 7/1227 | 188/322.5 |
| 4,957,471 A * | 9/1990 | St. John | F16H 7/1281 | 474/133 |
| 5,064,405 A * | 11/1991 | St. John | F16H 7/1281 | 474/117 |
| 5,152,721 A * | 10/1992 | Sajczvk | F16H 7/1218 | 474/117 |
| 5,266,067 A * | 11/1993 | Gapco | F16H 7/1281 | 474/112 |
| 5,423,723 A * | 6/1995 | Gardner | F16H 7/1281 | 474/135 |
| 5,478,285 A * | 12/1995 | Bakker | F16H 7/1218 | 474/135 |
| 5,776,025 A * | 7/1998 | Labudde | F16H 7/1281 | 474/133 |
| 5,919,107 A * | 7/1999 | Stepniak | F16H 7/1281 | 474/112 |
| 5,938,552 A * | 8/1999 | Serkh | F16H 7/1218 | 474/117 |
| 5,964,674 A * | 10/1999 | Serkh | F16H 7/1218 | 474/101 |
| 6,149,542 A * | 11/2000 | Lehtovaara | F16H 7/12 | 29/888.01 |
| 6,165,091 A * | 12/2000 | Dinca | F16F 9/145 | 474/101 |
| 6,196,940 B1 * | 3/2001 | Lehtovaara | F16H 7/12 | 474/112 |
| 6,605,013 B2 | 8/2003 | Chambers et al. | | |
| 6,659,896 B1 * | 12/2003 | Stief | F16H 7/1281 | 474/112 |
| 7,090,606 B2 * | 8/2006 | Dec | F16H 7/1281 | 474/117 |
| 7,285,065 B2 * | 10/2007 | Dinca | F16H 7/1281 | 474/112 |
| 7,611,431 B2 * | 11/2009 | Dinca | F16H 7/1281 | 474/112 |
| 7,837,582 B2 * | 11/2010 | Smith | F16H 7/1281 | 474/117 |
| 7,883,436 B2 * | 2/2011 | Mosser | F16H 7/1281 | 474/133 |
| 8,287,410 B2 * | 10/2012 | Schmid | F16H 7/1263 | 411/546 |
| 2004/0180745 A1 * | 9/2004 | Dinca | F16H 7/1281 | 474/135 |
| 2008/0026894 A1 * | 1/2008 | Dinca | F16H 7/1281 | 474/112 |
| 2008/0234083 A1 * | 9/2008 | Haenbeukers | F16H 7/1281 | 474/135 |
| 2010/0144473 A1 * | 6/2010 | Ward | F16H 7/1218 | 474/112 |

* cited by examiner

SPACER FOR BELT TENSIONER

CROSS-REFERENCE TO RELATED APPLICATION

This application is a National Stage of PCT Patent Application No. PCT/US2014/012718, filed Jan. 23, 2014, which claims the benefit of U.S. Provisional Patent Application No. 61/758,338, filed Jan. 30, 2013, the contents of which are incorporated herein by reference.

FIELD

This application relates generally to an internal combustion engine system, and more specifically to assembly and disassembly of a belt assembly of an internal combustion engine system.

BACKGROUND

An internal combustion engine typically includes a belt assembly driven by a crankshaft of the engine. The belt assembly includes a primary belt (e.g., fan belt, timing belt, accessory belt, etc.) wound about a series of pulleys. As the crankshaft rotates, the primary belt is driven along a path defined by the pulleys. Some of the pulleys are stationary relative to the driven belt, and other pulleys are rotatably driven by the driven belt. One or more of the driven pulleys is coupled to an accessory that utilizes the rotational energy of the driven pulley to provide functionality associated with the accessory. For the belt to remain coupled to the pulleys and to drive the drivable pulleys, the belt must be in tension about the pulleys.

Conventionally, an engine belt is placed in tension about pulleys by operation of a belt tensioner. The belt tensioner includes an arm that is pivotable about a pivot location and a belt pulley secured to an end of the arm. Proximate the pulley is a tool engagement receptacle. The tensioner is rotatable from an unloaded position to a loaded position. With the tensioner in the unloaded position, the belt can be fit loosely about the pulleys of the belt assembly, as well as the pulley of the belt tensioner. With assistance from a tool engaged with the tool engagement receptacle, and the belt held loosely in place, the tensioner can be rotated into the loaded position. As the pulley of the tensioner rotates into the loaded position, the pulley pulls on the belt to place the belt in tension about the pulleys. Although tensioner pivot locations vary by engine model and detail, they are often located near a water pump of the engine proximate a lower left engine quadrant when viewed from the front. Most often, the belt pulley and tool engagement receptacle are located between 10 o'clock and 5 o'clock positions relative to the pivot location and towards the engine crank centerline.

Often, the internal combustion engine includes additional or supplemental accessories that are driven by a secondary belt assembly (e.g., front end accessory drive). The secondary belt assembly includes a secondary belt wound about a set of pulleys in a manner similar to the primary belt assembly. Typically, the secondary belt assembly is positioned longitudinally adjacent or over the primary belt assembly to effectively cover the primary belt assembly. For a fully assembled engine, the position of the secondary belt assembly often significantly limits access to the installation tool engagement receptacle of the tensioner. Accordingly, to remove or install the primary belt, which requires access to the installation tool engagement receptacle of the tensioner, the secondary belt assembly must be removed.

Further, in some engine configurations, the position of the secondary belt assembly does not negatively affect access to the installation tool engagement receptacle, but other components of the engine, or engine congestion in general, may negatively affect such access.

SUMMARY

The subject matter of the present application has been developed in response to the present state of the art, and in particular, in response to the problems and needs in the internal combustion engine system art that have not yet been fully solved by currently available systems. For example, as discussed above, the secondary belt assembly in some engine configurations, and other components in other engine configurations, may cover or impinge on the installation tool engagement receptacle of the tensioner of the primary belt assembly, which obstructs access to the tensioner and restricts the ability to install and remove the belt of the primary belt assembly. Basically, with some prior art engines, in order to remove the belt of the primary assembly, the entire secondary belt assembly, or other components, must first be removed to provide access to the installation tool engagement receptacle. Exacerbating the problem is the fact that some internal combustion engine designs are prone to belt jump or walk-off events (e.g., when the belt jumps off of the tensioner), which require frequent access to the belt to reinstall and re-tension the belt. Accordingly, in certain embodiments, a spacer for a tensioner of an internal combustion engine is disclosed herein that improves the installation and removal of the belt of a primary belt assembly by moving the installation tool engagement receptacle away from the tensioner belt pulley (which can be associated with a congested portion of the engine) to the pivot location of the tensioner (which can be associated with a much less congested portion of the engine) to significantly improve access to the tensioner. In other words, the spacer for a belt tensioner described in the present disclosure overcomes many of the shortcomings of the prior art.

According to one embodiment, a belt assembly for an internal combustion engine that has a tensioner mount is described. The belt assembly includes a spacer that is rotatably coupleable to the tensioner mount, and a tensioner that is co-rotatably coupled to the spacer. The spacer is positioned between the tensioner and the tensioner mount.

In some implementations of the belt assembly, the spacer includes a retractable key that is configured to engage a first notch formed in a tensioner mount of the internal combustion engine. The tensioner mount can be formed in a block of the internal combustion engine. The spacer can further include a second notch, where the retractable key is configured to concurrently engage the first and second notches to prevent rotation of the spacer relative to the tensioner mount. The retractable key can include a spring.

According to certain implementations of the belt assembly, the tensioner includes a pulley that is positioned at a first side of the tensioner. The spacer includes a tensioner installation tool receptacle that is positioned near a second side of the tensioner that is opposite the first side. The tensioner installation tool receptacle can be spaced apart from the second side of the tensioner in a direction away from the first side of the tensioner. When the tensioner is co-rotatably coupled to the spacer, the installation tool receptacle may be positioned beyond an outer periphery of the tensioner.

In yet some implementations of the belt assembly, the tensioner includes a first engagement element and the spacer includes a second engagement element. Engagement between the first and second engagement elements can co-rotatably couple the tensioner to the spacer. The first engagement element can include a key and the second engagement element can include a notch. The key can be retractable relative to the notch.

According to another embodiment, an internal combustion engine includes a tensioner mount with a first notch. The internal combustion engine also includes a spacer that is rotatably coupled to the tensioner mount. The spacer includes a first key that is engageable with the first notch to prevent rotation of the spacer relative to the tensioner mount. The spacer further includes a second notch. Additionally, the internal combustion engine includes a tensioner that is co-rotatably coupled to the spacer. The tensioner includes a second key that is engageable with the second notch to prevent rotation of the tensioner relative to the spacer.

In some implementations of the internal combustion engine, the first key is resiliently biased into engagement with the first notch. The first key can be disengageable with the first notch to allow relative rotation between the spacer and the tensioner mount.

According to certain implementations of the internal combustion engine, the tensioner includes a pulley that is engageable with a belt of the engine. Further, the spacer can include a tensioner installation tool receptacle that is positioned near a side of the tensioner opposite the pulley. The spacer can have a thickness that is smaller than a thickness of the tensioner.

In yet another embodiment, described herein is a spacer that is positionable between a tensioner mount of an internal combustion engine and a tensioner of a belt assembly coupled to the internal combustion engine. The spacer includes a body with a first notch and a second notch. Additionally, the spacer includes an arm extending from the body. The arm includes a tensioner installation tool engaging receptacle. The spacer further includes a locking mechanism that includes a spring coupled to a key. The spring is resiliently flexible to move the key into and out of one of the first and second notches.

According to certain implementations of the spacer, the key is movable into a third notch formed in the tensioner mount to prevent relative rotation between the spacer and tensioner mount, and movable out of the third notch to allow relative rotation between the spacer and tensioner mount. The other of the first and second notches is engageable with a key formed in the tensioner to prevent relative rotation between the spacer and key. The body can be disk-shaped.

The described features, structures, advantages, and/or characteristics of the subject matter of the present disclosure may be combined in any suitable manner in one or more embodiments and/or implementations. In the above description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the above description and appended claims, or may be learned by the practice of the subject matter as set forth above.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
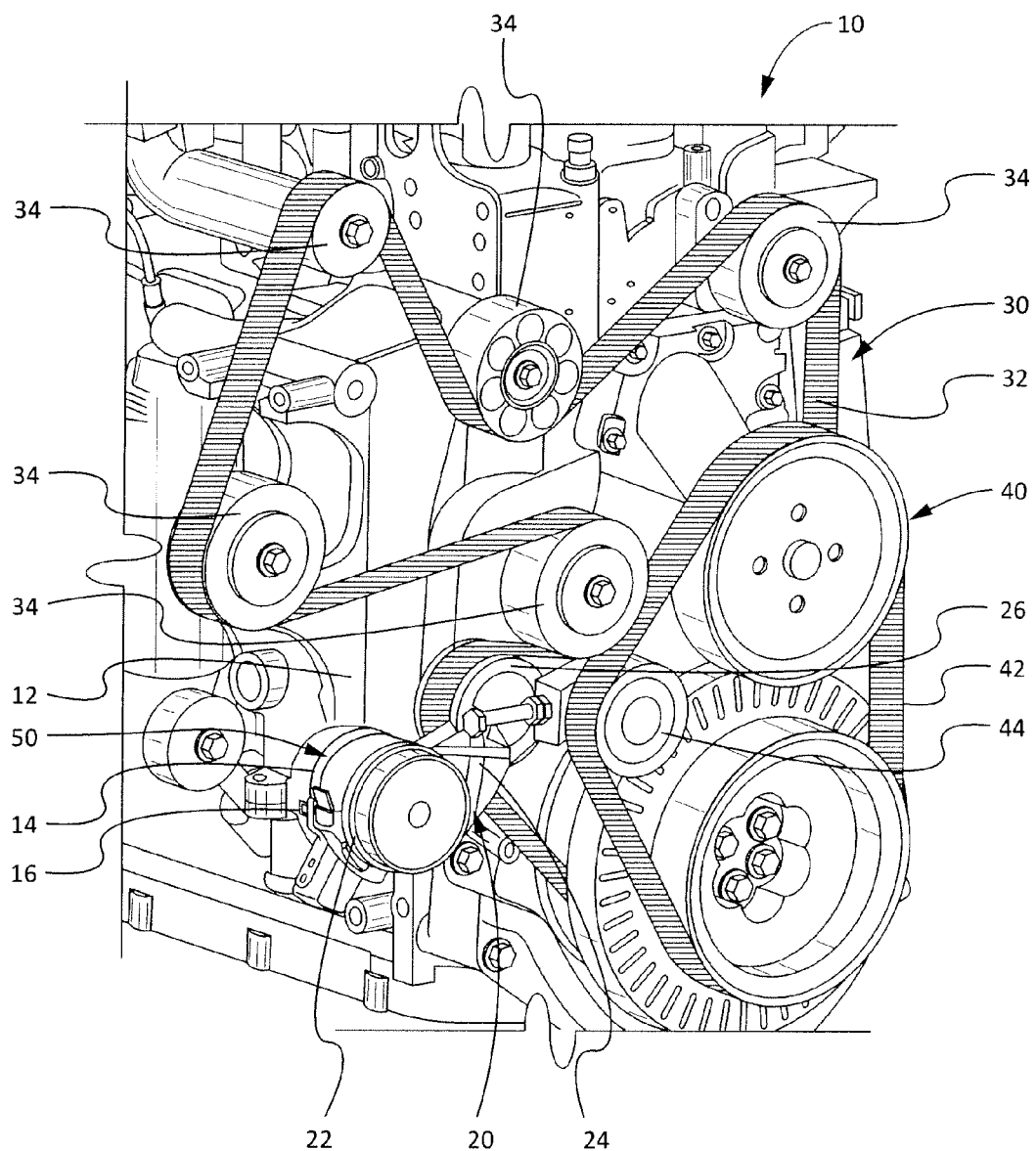
FIG. 1 is a perspective view of an internal combustion engine with a tensioner and tensioner spacer according to one embodiment.

Referring to FIG. 1, according to one embodiment, an internal combustion engine 10 includes an engine block 12 with a tensioner mount 14. The tensioner mount 14 includes a mount notch 16 formed into an outer periphery 15 of the mount (see, e.g., FIG. 3). The engine block 12 also includes a plurality of pulley mounts or apertures for receiving and supporting a plurality of pulleys 34 associated with a belt assembly 30. The pulleys 34 movably support and retain a belt 32, which can be any of various types of belts or chains. As discussed above, the belt 32 is driven about the pulleys, and drives at least some of the pulleys for distributing power to associated accessories. The belt assembly 30 can be considered a primary belt assembly, and the engine can further include a secondary belt assembly 40 in front or at least partially covering the primary belt assembly 30. Like the primary belt assembly 30, the secondary belt assembly includes a belt 32 wound about pulleys 34 for driving additional accessories.

Figure 2:
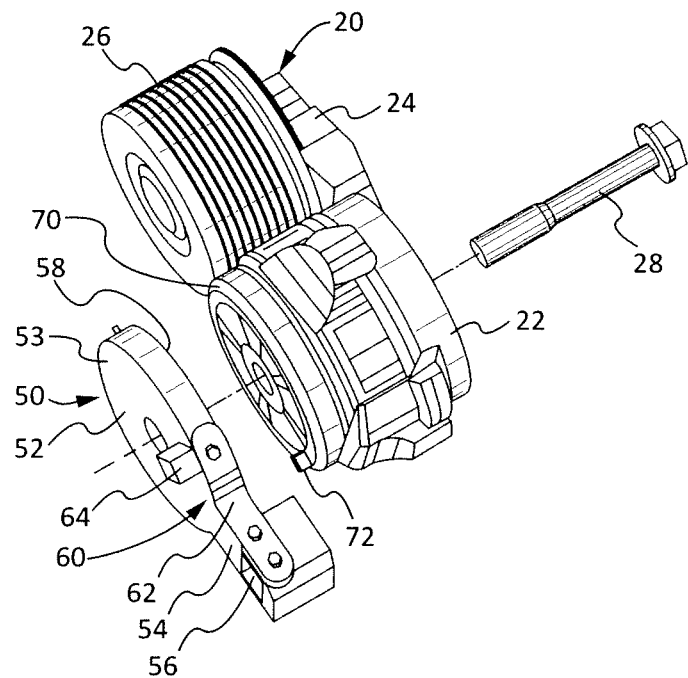
FIG. 2 is a perspective exploded view of a tensioner and spacer according to one embodiment.

The internal combustion engine 10 also includes a tensioner 20 coupled to the engine via a spacer 50. The tensioner 20 includes a body 22 and an arm 24 extending from the body. The end portion of the arm 25 radially away from the body 22 supports a pulley 26 about which the belt 32 is retained. The body 22 of the tensioner 20 includes a spacer engaging surface 70 with a locking key 72 protruding therefrom (see, e.g., FIG. 2). When assembled onto the engine 10, the spacer engaging surface 70 faces the engine. In some embodiments, the locking key 72 is retractable and sized to matingly engage the mount notch 16 in the tensioner mount 14. The tensioner 20 is actuatable to place the belt 32 in tension against the pulley 26 and pulleys 34 of the primary belt assembly 30, and to take the belt out of tension against the pulleys 26, 34. Actuation of the tensioner 20 is facilitated via operation of the spacer 50.

Figure 9:
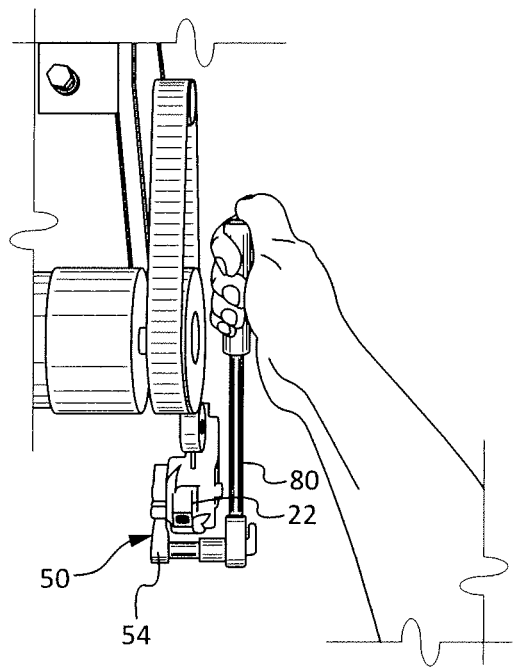
FIG. 9 is a side view of a user engaging a spacer to adjust a tensioner according to one embodiment.

The spacer 50 is mounted to the tensioner mount 14 and positioned between the tensioner 20 and the tensioner mount. Generally, the spacer 50 effectively couples the tensioner 20 to the tensioner mount 14 of the block 12. Moreover, the spacer 50 is co-rotatably coupled to the tensioner 20 such that rotation of the spacer 50 correspondingly rotates the tensioner. Referring to FIGS. 2-8, the spacer 50 includes a body 52 and an arm 54 extending radially outwardly from the body. At a radially outer end portion of the arm 54, the spacer 50 includes a tool engaging receptacle 56 configured to engage (e.g., receive) a corresponding engagement portion of a tool 80 (see, e.g., FIGS. 9 and 10). The portion of the arm 54 defining the tool engaging receptacle 56 may have a thickness greater than that of the arm to accommodate the torque applied to the receptacle by the tool 80 during assembly or disassembly.

Figure 6:
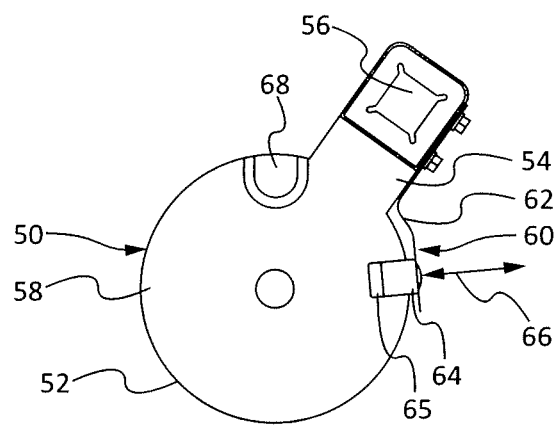
FIG. 6 is a rear view of a spacer according to one embodiment.
Figure 7:
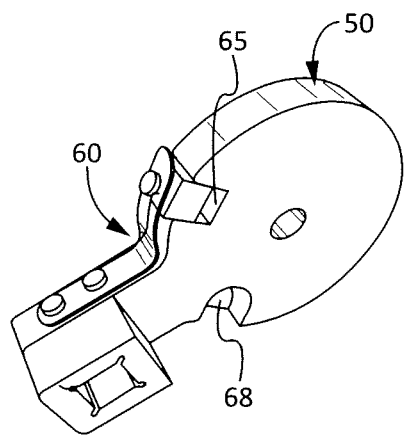
FIG. 7 is a front perspective view of a spacer according to one embodiment.
Figure 8:
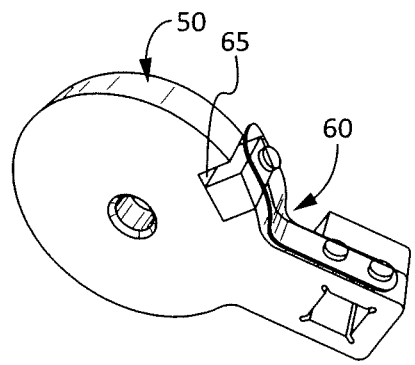
FIG. 8 is a rear perspective view of the spacer of FIG. 7.

The body 52 of the spacer 50 includes a mount engaging surface 53 and an opposing tensioner engaging surface 58. A thickness of the body 52 is defined between the surfaces 53, 58. The thickness of the body 52 can be any of various dimensions, but preferably is substantially smaller than the thickness of the tensioner 20. The mount engaging surface 53 faces the tensioner mount 14 and the tensioner engaging surface 58 faces away from the tensioner mount when the spacer 50 is coupled to the engine 10. In the illustrated embodiment, the mount engaging surface 53 is substantially flat to conform to the flat surfaces of the tensioner mount 14. As shown in FIGS. 6 and 7, the tensioner engaging surface 58 includes a notch 68 or recess that extends at least partially through the body 52. The notch 68 is sized to matingly receive the locking key 72 of the tensioner 20. The body 52 also includes a notch 65 formed in an outer periphery of the body. The body 52 and arm 54 of the spacer 50 can be made from any of various materials, such as metals (e.g., steel and aluminum).

The spacer 50 includes a locking mechanism 60 that is engageable and disengageable with the mount notch 16 of the tensioner mount 14 to respectively lock the spacer to and unlock the spacer from the tensioner mount. The locking mechanism 60 includes a spring 62 coupled to one or both of the body 52 and arm 54 of the spacer 50. In the embodiment depicted in FIGS. 2-10, the spring 62 is coupled to the arm 54 via screws. However, it is also possible for the spring 62 to be secured to the arm 54 and/or the body 52 via other types of fasteners, such as rivets, via welding, or by other securement mechanisms known in the art.

In the illustrated embodiment, a first portion of the spring 62 is secured to an outer periphery of the arm 54 and a second portion of the spring is positioned at least partially over the notch 65 formed in the body 52. The locking mechanism 60 also includes a key 64 coupled to the second portion of the spring 62. The key 64 is sized and shaped to at least partially fit within the notch 65. In the illustrated embodiment, the notch 65 has a generally rectangular cross-sectional shape, and the key 64 is a block-type element with a generally rectangular cross-sectional shape. The spring 62 is a resiliently flexible element configured to bias the key 64 into the notch 65. However, the biasing force of the spring 62 can be overcome to flex the spring and move the key 64 out of the notch 65. In this manner, the locking mechanism 60 is configured to facilitate radially inward and outward movement of the key 64 relative to the notch 65 as indicated by directional arrows 66.

In the illustrated embodiment, the spring 62 is a substantially flat and elongate sheet made from a resiliently flexible material, such as a metal (e.g., steel, aluminum, alloys of the same, and the like), high-temperature polymer, composite, etc. In other embodiments, the spring 62 can be any of various resiliently flexible components or devices capable of biasing the key 64 into the notch 65, and resiliently flexing under a counterforce greater than the biasing force to allow the key 64 to move out of the notch. For example, the spring 62 can be, or incorporate, a helical compression spring, an elastomeric device, and the like.

Figure 3:
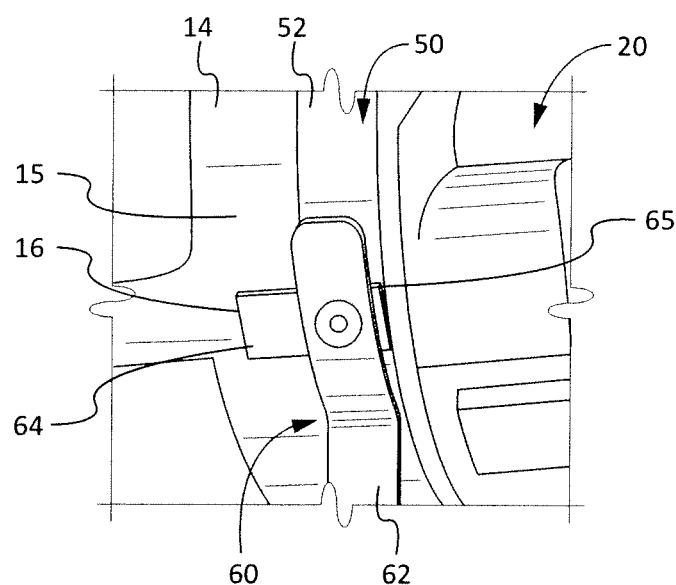
FIG. 3 is a perspective view of a locking mechanism of a spacer according to one embodiment.

For operation, the tensioner 20 and spacer 50 are rotatably mounted to the tensioner mount 12 of the block 12. The spacer 50 is initially positioned in an unloaded or unlocked position. In the unlocked position, the spacer 50 is positioned relative to the tensioner mount 14 such that the key 64 of the locking mechanism 60 rests on the outer periphery 15 of the tensioner mount 14 and the body 52 of the spacer is substantially coaxial with the tensioner mount. In the illustrated embodiment, the body 52 is sized and shaped to substantially match the tensioner 14. For example, as shown in FIG. 3, the outer periphery of the body 52 is substantially flush with the outer periphery 15 of the tensioner mount 14. Accordingly, with the key 64 resting on the outer periphery 15, the spring 52 is flexed radially outwardly and the key is positioned outside of the notch 65. The body 22 of the tensioner 20 is mounted to the body 52 of the spacer 50 such that the locking key 72 of the tensioner is inserted into the notch 68 of the spacer. Engagement between the locking key 72 and the notch 68 facilitate co-rotation of the tensioner 20 relative to the spacer 50. In other words, as the spacer 50 is rotated, the tensioner 20 correspondingly rotates. The tensioner 20 and spacer 50 are rotatably secured to the tensioner mount 14 via a fastener 28 extending through coaxial apertures in the tensioner and spacer, and threadably engaging the engine block 12.

With the tensioner 20 and spacer 50 in the unloaded or unlocked position, a tool (e.g., the tool 80 shown in FIGS. 9 and 10) can engage the tool engaging receptacle 56 of the spacer 50 and be operated (e.g., pulled) to rotate the spacer, and thus the tensioner, into a loaded or locked position. As defined herein, the loaded position is associated with a position of the spacer 50 where the notch 65 of the spacer aligns with the mount notch 16 of the tensioner mount 14 (see, e.g., FIG. 3). As the spacer 50 rotates relative to the tensioner mount 14, the key 64 slides along the outer periphery 15 of the tensioner mount. With the mount notch 16 being aligned with the notch 65 of the spacer 50, the outer periphery 15 of the tensioner mount 14 no longer supports the key 64 of the locking mechanism 60 (e.g., because the key is now positioned over the mount notch). As the notch 65 comes into alignment with the mount notch 16, the bias of the flexed spring 62 urges the key 64 radially inwardly into the notch 65 and mount notch 16. In some implementations, an operator may manually assist with urging the key 64 into the notches 16, 65 by pushing the key into the notches. With the key 64 positioned within the notches 16, 65, the spacer 50, and thus at least the body 22 of the tensioner 20, is prevented from moving relative to the tensioner mount 14. Accordingly, positioning the key 64 within the notches 16, 65 effectively locks the spacer 50 and tensioner 20 in place.

The spacer 50 and tensioner 20 can be unlocked from the tensioner mount 15 simply by releasing the key 64 from within the notches 16, 65. In one implementation, this is accomplished by slightly rotating the spacer 50 with the tool 80 to reduce the side-force acting on the key 64 by the mount notch 16, and then manually pulling the key out of the notches 16, 65. With the key 64 clear of the notches 16, 65, the tool 80 can be operated to rotate the spacer 50 relative to the tensioner mount 14 from the locked position to the unlocked position for disassembly, replacement or adjustment of one or more of the components of the primary belt assembly 30.

Figure 4:
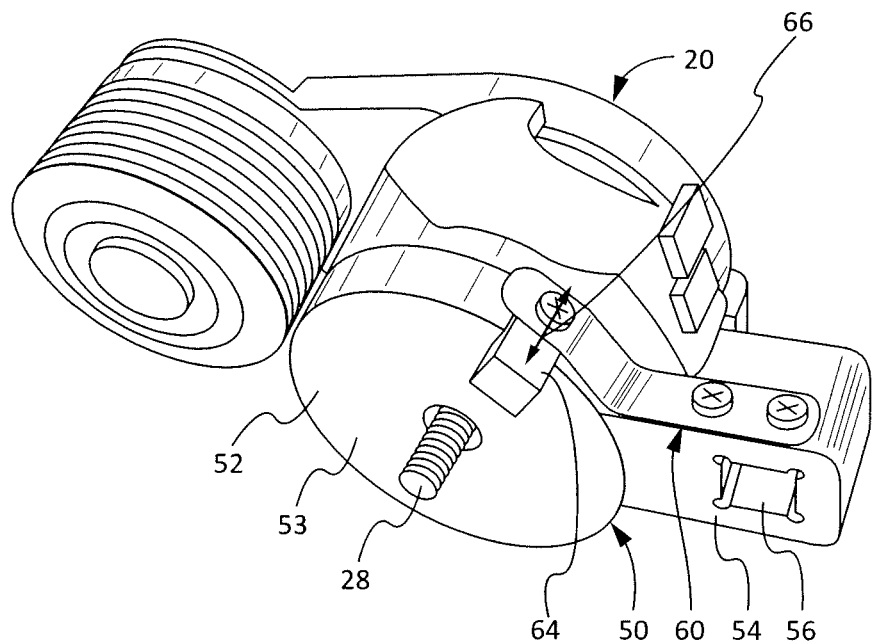
FIG. 4 is a rear perspective view of a tensioner and spacer assembly according to one embodiment.
Figure 5:
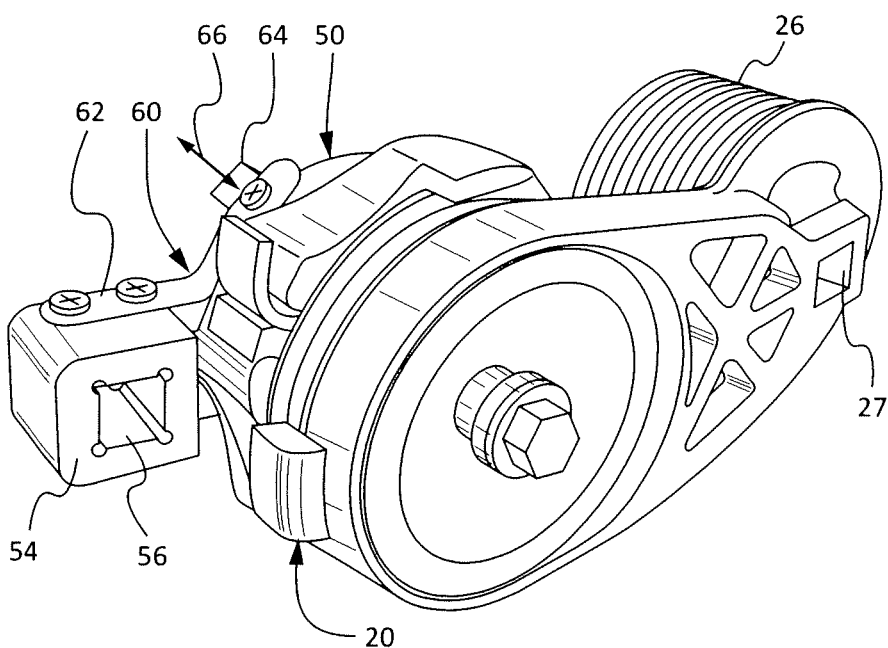
FIG. 5 is a front perspective view of the tensioner and spacer assembly of FIG. 4.
Figure 10:
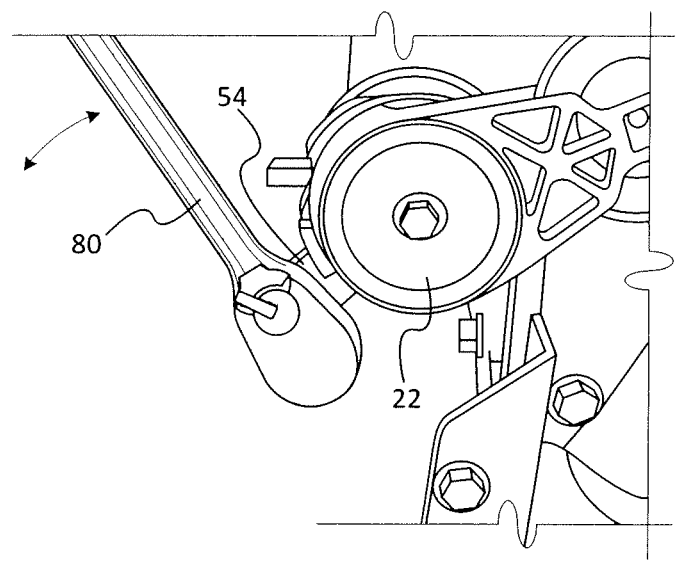
FIG. 10 is a front view of a tool engaging a spacer to adjust a tensioner according to one embodiment.

Referring to FIGS. 4, 5, and 10, the arm 54 of the spacer 50 extends from the body 52 in a direction away from the arm 24 and pulley 26 of the tensioner 20. Accordingly, the tool engaging receptacle 56 of the arm 54 is positioned on a substantially opposite side of the body 22 of the tensioner 20 compared to the arm 24 and pulley 26. As discussed above, in many engine configurations, a secondary belt assembly or other components are typically positioned over the arm 24 and pulley 26 of the tensioner, which effectively prevents access to any tool engaging features (e.g., receptacle 27 (see, e.g., FIG. 5)) proximate the arm and pulley used to install and install the tensioner. With the tool engaging receptacle 56 of the spacer 50 being positioned on the opposite side of the tensioner 20 as the arm 24 and pulley 26, the receptacle 56 is more easily accessible, even with a secondary belt assembly or other components covering the tensioner 20. For this reason, the primary belt assembly can be disassembled and reassembled (e.g., the belt 32 can be taken on and off) without removing the secondary belt assembly or any other components covering the tensioner 20.

According to one embodiment, an existing internal combustion engine with a belt tensioner 20 coupled directly to the tensioner mount 14 can be retrofitted with a spacer 50 to improve the accessibility to the tensioner for repairs or replacements. Generally, retrofitting the engine includes removing the belt tensioner 20 from the tensioner mount 14, mounting the spacer 50 to the tensioner mount, and coupling the tensioner to the spacer by inserting the locking key 72 of the tensioner into the notch 68 of the spacer.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A belt assembly for an internal combustion engine having a tensioner mount, comprising:
   a spacer rotatably coupleable to the tensioner mount; and
   a tensioner co-rotatably coupled to the spacer, the spacer being positioned between the tensioner and the tensioner mount,
   wherein the spacer comprises a retractable key configured to engage a first notch formed in a tensioner mount of the internal combustion engine and concurrently engage a second notch in the spacer so as to prevent rotation of the spacer relative to the tensioner mount, and wherein the spacer is configured to move radially inward and outward so as to concurrently engage and disengage the first notch and the second notch.

2. The belt assembly of claim 1, wherein the tensioner mount is formed in a block of the internal combustion engine.

3. The belt assembly of claim 1, wherein the retractable key comprises a spring.

4. The belt assembly of claim 1, wherein the tensioner comprises a pulley positioned at a first side of the tensioner, and the spacer comprises a tensioner installation tool receptacle positioned near a second side of the tensioner opposite the first side.

5. The belt assembly of claim 4, wherein the tensioner installation tool receptacle is spaced apart from the second side of the tensioner in a direction away from the first side of the tensioner.

6. The belt assembly of claim 1, wherein the spacer comprises a tensioner installation tool receptacle, and wherein when the tensioner is co-rotatably coupled to the spacer the installation tool receptacle is positioned beyond an outer periphery of the tensioner.

7. The belt assembly of claim 1, wherein the tensioner comprises a first engagement element and the spacer comprises a second engagement element, and wherein engagement between the first and second engagement elements co-rotatably couples the tensioner to the spacer.

8. The belt assembly of claim 7, wherein the first engagement element comprises a key and the second engagement element comprises a notch.

9. The belt assembly of claim 8, wherein the key is retractable relative to the notch.

10. An internal combustion engine, comprising:
a tensioner mount comprising a first notch;
a spacer rotatably coupled to the tensioner mount, the spacer comprising a first key engageable with the first notch to prevent rotation of the spacer relative to the tensioner mount, wherein the spacer further comprises a second notch; and
a tensioner co-rotatably coupled to the spacer, the tensioner comprising a second key engageable with the second notch to prevent rotation of the tensioner relative to the spacer, wherein the first key includes a retractable key configured to move radially inward and outward so as to concurrently engage and disengage the first notch and the second notch.

11. The internal combustion engine of claim 10, wherein the first key is resiliently biased into engagement with the first notch.

12. The internal combustion engine of claim 11, wherein the first key is disengageable with the first notch to allow relative rotation between the spacer and the tensioner mount.

13. The internal combustion engine of claim 10, wherein the tensioner comprises a pulley that is engageable with a belt of the engine, and wherein the spacer comprises a tensioner installation tool receptacle positioned near a side of the tensioner that is opposite the pulley.

14. The internal combustion engine of claim 10, wherein the spacer has a thickness smaller than a thickness of the tensioner.

15. A spacer positionable between a tensioner mount of an internal combustion engine and a tensioner of a belt assembly coupled to the internal combustion engine, comprising:
a body comprising a first notch and a second notch;
an arm extending from the body, the arm comprising a tensioner installation tool engaging receptacle; and
a locking mechanism comprising a spring coupled to a key, the spring being resiliently flexible to move radially inward and outward so as to concurrently move the key into and out of the first and second notches.

16. The spacer of claim 15, wherein the key is movable into a third notch formed in the tensioner mount to prevent relative rotation between the spacer and tensioner mount, and movable out of the third notch to allow relative rotation between the spacer and tensioner mount.

17. The spacer of claim 15, wherein the other of the first and second notches is engageable with a key formed in the tensioner to prevent relative rotation between the spacer and key.

18. The spacer of claim 15, wherein the body is disk-shaped.

* * * * *